US006385642B1

(12) United States Patent
Chlan et al.

(10) Patent No.: US 6,385,642 B1
(45) Date of Patent: May 7, 2002

(54) INTERNET WEB SERVER CACHE STORAGE AND SESSION MANAGEMENT SYSTEM (75) Inventors: Michael M. Chlan, Alpharetta; Richard E. Davis, Suwanee, both of GA (US)

(73) Assignee: YouDecide.com, Inc., Duluth, GA (US)

(*) Notice: Subject to any disclaimer, the term of this patent is extended or adjusted under 35 U.S.C. 154(b) by 0 days.

(21) Appl. No.: 09/294,621

(22) Filed: Apr. 19, 1999

Related U.S. Application Data (63) Continuation-in-part of application No. 09/203,954, filed on Dec. 2, 1998.
(60) Provisional application No. 60/106,819, filed on Nov. 3, 1998, and provisional application No. 60/110,423, filed on Dec. 1, 1998.

(51) Int. Cl.[7] .............................................. G06F 15/16
(52) U.S. Cl. ........................ 709/203; 709/228; 709/227
(58) Field of Search ................................ 709/227, 228, 709/203, 213, 215

(56) References Cited

U.S. PATENT DOCUMENTS

| 3,581,072 A | 5/1971 | Nymeyer ..................... 426/622 |
| 4,598,367 A | 7/1986 | DeFrancesco et al. ........ 705/36 |
| 4,677,552 A | 6/1987 | Sibley, Jr. .................... 705/37 |

(List continued on next page.)

FOREIGN PATENT DOCUMENTS

| FR | 2 658 635 | 2/1991 |
| NL | 9300266 | 2/1993 |
| WO | WO/92/15174 | 9/1992 |
| WO | WO/96/34356 | 10/1996 |

OTHER PUBLICATIONS

T. Berners–Lee, R. Fielding, H. Frystyk; Hypertext Transfer Protocol—HTTP/1.0; May 1996; p. 1–52.
"Hughes Aircraft Employee Federal Credit Union First to Offer Interactive Website Insurance Comparisons", Business Wire, May 1996.
"HTTP State Management Mechanism", Feb. 1997, D. Kristol, Bell Laboratories, Lucent Technologies.
"Session Tracking", http://lorlei.interactivecorp.com Dec. 29, 1997.
Article entitled "Make the Web do your work" by Ken Fermoyle, Jul. 15, 1998, 4 pages.

(List continued on next page.)

Primary Examiner—Zarni Maung
Assistant Examiner—Andrew Caldwell
(74) Attorney, Agent, or Firm—Thomas, Kayden, Horstemeyer & Risley, LLP (57) ABSTRACT In an Internet implementation, a session is maintained between an Internet web server and a client browser through the use of at least one temporary cache file, preferably saved in a location local to the web server. The web server also interacts with at least one data source, preferably located behind a firewall from the web server. After a cache file is created, it is used to store data received from the client and from the data source, resulting in fewer interactions with the data source. The cache file is saved from working memory before each page is generated and transmitted from the web server, after which the working memory becomes available for other uses. Since each page includes a reference to the cache file, such as in a hidden form field or in the URL of a hyperlink, for example, the session is effectively maintained between pages when the user interacts with the page to generate data that is transmitted from the client to the web server, at which point the web server opens the referenced cache file.

36 Claims, 7 Drawing Sheets

U.S. PATENT DOCUMENTS

| | | | | |
|---|---|---|---|---|
| 4,736,294 | A | 4/1988 | Gill et al. | 705/38 |
| 4,799,156 | A | 1/1989 | Shavit et al. | 705/26 |
| 4,903,201 | A | 2/1990 | Wagner | 705/37 |
| 4,914,587 | A | 4/1990 | Clouse | 705/38 |
| 5,063,507 | A | 11/1991 | Lindsey et al. | 705/26 |
| 5,101,353 | A | 3/1992 | Lupien et al. | 705/37 |
| 5,121,486 | A | 6/1992 | Kurihara et al. | 710/131 |
| 5,136,501 | A | 8/1992 | Silverman et al. | 705/37 |
| 5,165,020 | A | 11/1992 | Sudama et al. | 709/227 |
| 5,168,446 | A | 12/1992 | Wiseman | 705/37 |
| 5,202,826 | A | 4/1993 | McCarthy | 705/14 |
| 5,212,789 | A | 5/1993 | Rago | 707/8 |
| 5,231,571 | A | 7/1993 | D'Agostino | 705/36 |
| 5,239,462 | A | 8/1993 | Jones et al. | 705/38 |
| 5,243,515 | A | 9/1993 | Lee | 705/37 |
| 5,258,908 | A | 11/1993 | Hartheimer et al. | 705/37 |
| 5,262,941 | A | 11/1993 | Saladin et al. | 705/38 |
| 5,274,547 | A | 12/1993 | Zoffel et al. | 705/38 |
| 5,287,268 | A | 2/1994 | McCarthy | 705/14 |
| 5,287,507 | A | 2/1994 | Hamilton et al. | 709/315 |
| 5,305,200 | A | 4/1994 | Hartheimer et al. | 705/37 |
| 5,319,542 | A | 6/1994 | King, Jr. et al. | 705/27 |
| 5,325,297 | A | 6/1994 | Bird et al. | 707/530 |
| 5,329,589 | A | 7/1994 | Fraser et al. | 379/2 |
| 5,349,642 | A | 9/1994 | Kingdon | 380/25 |
| 5,375,055 | A | 12/1994 | Togher et al. | 705/37 |
| 5,383,113 | A * | 1/1995 | Kight et al. | 705/40 |
| 5,384,848 | A | 1/1995 | Kikuchi | 380/25 |
| 5,394,324 | A * | 2/1995 | Clearwater | 705/8 |
| 5,404,523 | A | 4/1995 | DellaFera et al. | 709/101 |
| 5,426,281 | A * | 6/1995 | Abecassis | 235/379 |
| 5,434,918 | A | 7/1995 | Kung et al. | 380/25 |
| 5,455,953 | A | 10/1995 | Russell | 710/266 |
| 5,481,612 | A | 1/1996 | Campana et al. | 380/25 |
| 5,495,533 | A | 2/1996 | Linehan et al. | 380/25 |
| 5,500,897 | A | 3/1996 | Hartman, Jr. | 380/25 |
| 5,586,260 | A | 12/1996 | Hu | 713/201 |
| 5,594,910 | A | 1/1997 | Filepp et al. | 712/28 |
| 5,604,803 | A | 2/1997 | Aziz | 380/25 |
| 5,604,807 | A | 2/1997 | Yamaguchi et al. | 380/259 |
| 5,606,719 | A | 2/1997 | Nichols et al. | 710/56 |
| 5,608,800 | A | 3/1997 | Hoffmann et al. | 380/25 |
| 5,611,052 | A * | 3/1997 | Dykstra et al. | 705/38 |
| 5,655,085 | A | 8/1997 | Ryan et al. | 705/4 |
| 5,678,041 | A | 10/1997 | Baker et al. | 707/9 |
| 5,680,461 | A | 10/1997 | McManis | 713/162 |
| 5,689,566 | A | 11/1997 | Nguyen | 713/155 |
| 5,694,551 | A | 12/1997 | Doyle et al. | 705/26 |
| 5,696,898 | A | 12/1997 | Baker et al. | 713/201 |
| 5,710,887 | A | 1/1998 | Chelliah et al. | 705/26 |
| 5,745,681 | A | 4/1998 | Levine et al. | 709/200 |
| 5,758,327 | A | 5/1998 | Gardner et al. | 705/26 |
| 5,758,328 | A | 5/1998 | Giovannoli | 705/26 |
| 5,774,670 | A * | 6/1998 | Montulli | 709/227 |
| 5,774,870 | A | 6/1998 | Storey | 705/14 |
| 5,784,565 | A | 7/1998 | Lewine | 700/229 |
| 5,794,207 | A * | 8/1998 | Walker et al. | 705/23 |
| 5,797,127 | A * | 8/1998 | Walker et al. | 705/5 |
| 5,826,242 | A | 10/1998 | Montulli | 705/27 |
| 5,835,742 | A * | 11/1998 | Smith | 709/227 |
| 5,835,896 | A * | 11/1998 | Fisher et al. | 705/37 |
| 5,842,178 | A | 11/1998 | Giovannoli | 705/26 |
| 5,845,265 | A * | 12/1998 | Woolston | 705/37 |
| 5,870,473 | A | 2/1999 | Boesch et al. | 705/78 |
| 5,870,619 | A | 2/1999 | Maritzen et al. | 705/26 |
| 5,870,719 | A * | 2/1999 | Maritzen et al. | 705/26 |
| 5,878,403 | A * | 3/1999 | DeFrancesco et al. | 705/38 |
| 5,884,312 | A | 3/1999 | Dustan et al. | 707/10 |
| 5,890,138 | A * | 3/1999 | Godin et al. | 705/26 |
| 5,892,924 | A | 4/1999 | Lyon et al. | 709/245 |
| 5,897,620 | A * | 4/1999 | Walker et al. | 705/5 |
| 5,914,951 | A | 6/1999 | Bentley et al. | 370/352 |
| 5,917,810 | A | 6/1999 | De Bot | 370/294 |
| 5,920,705 | A | 7/1999 | Lyon et al. | 709/240 |
| 5,937,421 | A | 8/1999 | Petrov et al. | 707/526 |
| 5,960,411 | A | 9/1999 | Hartman et al. | 705/26 |
| 5,978,799 | A | 11/1999 | Hirsch | 707/4 |
| 5,999,973 | A * | 12/1999 | Glitho et al. | 709/223 |
| 6,023,684 | A | 2/2000 | Pearson | 705/35 |
| 6,061,738 | A | 5/2000 | Osaku et al. | 709/245 |
| 6,076,108 | A * | 6/2000 | Courts et al. | 709/227 |
| 6,189,003 | B1 | 2/2001 | Leal | 707/2 |
| 6,223,215 | B1 * | 4/2001 | Hunt et al. | 709/217 |

OTHER PUBLICATIONS

Article entitled "Web sites promise to ease drudgery of getting a mortgage" by Robert L. Scheir, Sep. 28, 1998, 1 page.

Article entitled "Getting a mortgage in cyberspace isn't for everyone" by Brad Grimes, Nov. 10, 1998;, 1 page.

Article entitled "Online mortgages: Less than meets the eye" by Robert L. Scheier, Jan. 13, 1999, 2 pages.

Article entitled "Online Home Mortgaging Is The Future" http://www.cnn.com/TECH/computing/9905/12/mortgage.idg, CNN Interactive, May 12, 1999, 2 pages.

"QuickenMortgage.com" web site pages, http://www.quickenmortgage.com, Oct. 31, 1999, 7 pages.

"AUTOWEB.com" web site pages, http://www.autoweb.com/, Nov. 3, 1999, 6 pages.

"MSN HomeAdvisor.com" web site pages, http://www.homeadvisor.msn,com/ie/default.asp, Oct. 31, 1999, 8 pages.

"LendingTree.com" web site pages, http://www.lendingtree.com/new/asp?source=888&siteid=, Oct. 31, 1999, 3 pages.

"mortgage.com" web site pages, http://www.mortgage.com/, Oct. 31, 1999, 7 pages.

"Countrywide Home Loans" web site pages, http;//www.countrywide.com/, Oct. 31, 1999, 2 pages.

"Loan Web.com" web site pages, http://www.loanweb.com, Oct. 31, 1999, 2 pages.

"Keystroke.com" web site pages, http://www.keystroke.com/, Nov. 3, 1999, 4 pages.

"INSWEB.com" web site pages, http://www.insweb.com/, Apr. 5, 1999, 31 pages.*

"QuickenInsurance.com" web site pages, http://www.insuremarket.com/, Nov. 22, 1999, 13 pages.*

"Quotesmith.com" web site pages, http://www.quotesmith.com/, Nov. 22, 1999, 13 pages.*

"iOwn.com" web sitepages, https://secure.iown.com/secure/cpreapp.dll/emphistory, Nov. 22, 1999, 8 pages.*

"E-LOAN.com" web site pages, http://www.eloan.com/, Nov. 22, 1999, 17 pages.*

* cited by examiner

INTERNET WEB SERVER CACHE STORAGE AND SESSION MANAGEMENT SYSTEM

CROSS-REFERENCES TO RELATED APPLICATIONS

This application is a continuation-in-part of U.S. patent application Ser. No. 09/203,954, filed on Dec. 2, 1998, and also claims the benefit of U.S. Provisional patent application Ser. No. 601106,819, filed Nov. 3, 1998, and U.S. Provisional patent application Ser. No. 60/110,423, filed Dec. 1, 1998, all of which are incorporated herein by reference in their entireties.

STATEMENT AS TO ANY INVENTION RIGHTS UNDER FEDERALLY SPONSORED RESEARCH

Not applicable.

BACKGROUND OF THE INVENTION

The present invention relates generally to the field of session management, and more particularly to the field of database session management on the Internet, in one embodiment of the present invention.

The Internet, also referred to as a global computer network, or network of computer networks, includes computers connected through a set of communication protocols known as Transmission Control Protocol/Internet Protocol (TCP/IP). One popular component of the Internet is the World Wide Web (WWW), or "the web," which is a collection of resources on servers on the Internet that utilize a Hypertext Transfer Protocol (HTTP), which is an application protocol that provides users access to those resources (often referred to as "pages," which can be in static or dynamically generated formats, including text, form entry fields, graphics, images, sound, video, etc.) using a Standard Generalized Markup Language (SGML), such as the Hypertext Markup Language (HTML), which is an information management standard for providing platformindependent and application-independent resources that retain formatting, indexing, and- inter-resource hyperlinking information.

One reason for the Internet's rapid growth is the introduction and widespread use of web browsers, which are HTML-compliant user client software programs, or portions of other programs, providing simple graphical user interface (GUI) access to resources on web servers. The use of an HTML-compliant client, such as a web browser, involves specification of an address via a Uniform Resource Locator (URL). A URL may include reference to a static resource or a reference to a software program on the web server, such as a Common Gateway Interface (CGI) script, as an example, which may interact with a database, or other data source, to dynamically generate the resource requested by the user through the web browser. When a user enters data into fields on a form web page and then submits that data, the browser communicates that data to the web server, as part of or accompanying the URL transmitted from the browser to the web server, which may then be used by a CGI script in interacting with the data source to generate the next resource for the user.

Like many network protocols, HTTP uses a client-server model. An HTTP client, such as a user browser, opens a connection and sends a request message to an HTTP server, such as a web server, which then returns a response message, usually containing the resource that was requested. After delivering the response, the web server closes the connection, which makes HTTP a stateless protocol, i.e. not maintaining any connection information between transactions. In other words, HTTP does not practically provide for maintaining a "session" as a user requests and interacts with various resources. Because of transfer speed limitations of the Internet, users can become frustrated waiting on large resources to slowly download to user browsers. In addition, very large resources can be confusing to many users.

Consequently, designers of web resources tend to break larger resources into multiple smaller resources to speed download times for each of the smaller resources, as well as to present users with resources that are more manageable and understandable. However, since HTTP is a stateless protocol, designers needed to develop a method for conveniently maintaining a session between user interactions with the different resources. One method of addressing this problem has become known as "cutting a cookie" on a user's computer, which often includes the web server reading and writing certain information to a user's hard drive in files called "cookies." Since many users do not allow such manipulation of their hard drives, and since the amount of data needed in some sessions would make this solution unworkable, the use of cookies does not fully address this problem. Other methods of attempting to efficiently maintain a session include inserting information as hidden form fields or part of the return URL in the resources, or web pages, themselves. As with cookies, some sessions may require more data than would be practical to include in such hidden form fields or URLs. In addition, such methods may expose sensitive data to unauthorized access.

Yet another attempt at effectively solving this problem of efficiently maintaining a session includes using the primary data source used in dynamically generating the resources. In other words, the data source would be accessed every time the web server receives data submitted by a user and one of the many smaller resources is generated. Unfortunately, such a method is often a rather inefficient use of a very busy data source and can lead to higher costs and complexity for data sources supporting web resources. Furthermore, if the data source is not located on the web server, additional delay may be introduced. On the other hand, locating the data source on the web server could create a larger risk of unauthorized access.

There is, therefore, a need for a system for addressing these and other related and unrelated problems.

SUMMARY OF THE INVENTION

In addition to other implementations, in an Internet implementation, a session is maintained between an Internet web server and a client browser through the use of at least one temporary cache file, preferably saved in a location local to the web server. The web server also interacts with at least one data source, preferably located behind a firewall from the web server. After a cache file is created, it is used to store data received from the client and from the data source, resulting in fewer interactions with the data source. The cache file is saved from working memory before each page is generated and transmitted from the web server, after which the working memory becomes available for other uses. Since each page includes a reference to the cache file, such as in a hidden form field or in the URL of a hyperlink, for example, the session is effectively maintained between pages when the user interacts with the page to generate data that is transmitted from the client to the web server, at which point the web server opens the referenced cache file.

BRIEF DESCRIPTION OF THE SEVERAL VIEWS OF THE DRAWINGS

The accompanying drawings incorporated in and forming a part of the specification illustrate several aspects of the present invention, and together with the description, serve to explain the principles of the invention.

Reference will now be made in detail to the description of the invention as illustrated in the drawings. While the invention will be described in connection with these drawings, there is no intent to limit it to the embodiments disclosed therein.

DETAILED DESCRIPTION OF THE INVENTION

Figure 1:
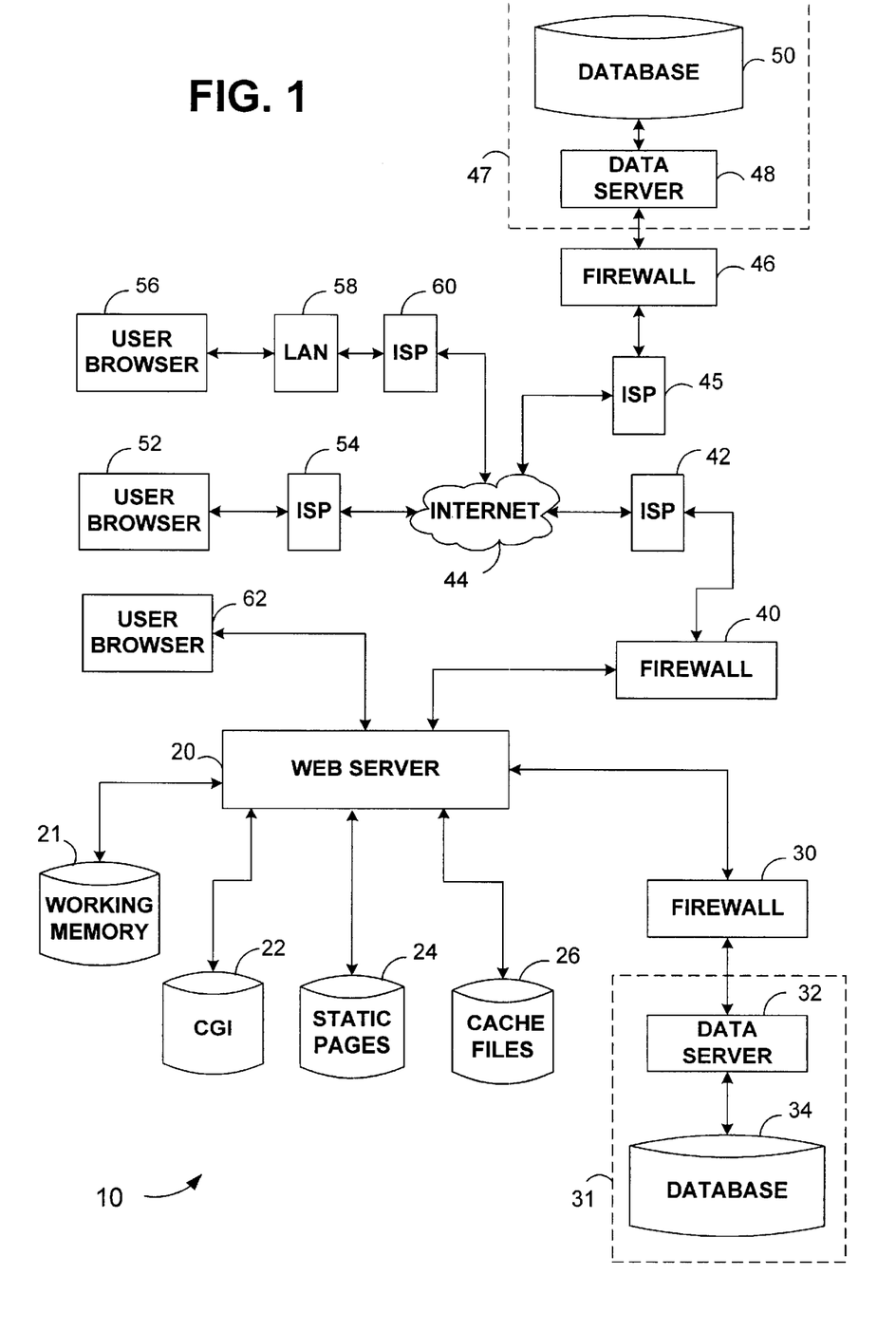
FIG. 1 is a block diagram illustrating various acceptable implementations of components associated with the present invention, in accordance with various embodiments of the present invention.

Turning now to the drawings, wherein like reference numerals designate corresponding parts throughout the drawings, FIG. 1 is a block diagram illustrating various acceptable implementations of components associated with a web server cache storage and session management system 10 of the present invention, in accordance with various embodiments of the present invention. A web server 20 is shown connected to working memory 21, common gateway interface (CGI) programming 22, static pages 24, and cache files 26. A firewall 30 is shown connecting the web server 20 to a data source 31, represented as a data server 32 connected to a database 34. Another firewall 34 is shown connecting the web server 20 to an Internet service provider (ISP) 42, which is connected to Internet 44. Another ISP 45 is shown connecting a firewall 46 to a data source 47, including data server 48 and database 50, to the Internet 44. A user browser 52 is shown connected to the Internet 44 through an ISP 54, and a user browser 56 is connected through a local area network (LAN) 58 and an ISP 60 to the Internet. A user browser 62 is shown connected directly to the web server 20. Except for the web server 20, each of the elements shown in FIG. 1 are representative of multiple similarly situated components. In addition, except to the extent discussed herein regarding the functionality of the present invention, the elements shown in FIG. 1 essentially include conventional hardware and software components, as would be understood by those reasonably skilled in the art of the present invention. For example, a user browser is understood to include various types of conventional browsing functionality, including, for example, a browser software program running on a personal computer, as well as browser functionality incorporated into an operating system or functioning with other hardware, such as a handheld device, a television, etc.

As stated above, FIG. 1 illustrates various acceptable implementations of the present invention. For example, one implementation includes user browser 52 operating through ISP 54, the Internet 44, ISP 42, and firewall 40 to interact with the web server 20 and accompanying elements 21, 22, 24, and 26, which interact with data server 32 and database 34 through firewall 30. Another implementation includes the previous implementation with the addition of elements 45, 46, 48 and 50. Still other implementations include providing access to web server 20 for user browsers 56 through LAN 58, ISP 60, and Internet 44, as well as directly to user browser 62. Still other implementations omit the Internet entirely, including only user browser 62 (and other similarly situated browsers, as discussed above), web server 20 with accompanying elements 21, 22, 24, and 26, as well as firewall 30, data server 32, and database 34. Still other implementations include omitting firewall 30 and combining web server 20 with data server 32, making database 34 directly accessible by web server 20. Also, the lines between the web server 20 and the other elements should be understood to include direct local connections, local area network connections, and wide area network connections. For example, although not shown, the cache files 26 are located across the Internet 44 from the web server 20 in other implementations. Of course, one ISP might be used by multiple elements shown in FIG. 1, and the web server 20 is located within an ISP in some embodiments. Firewalls are also variable in other embodiments, including the omission of one or more firewalls, as well as the addition of firewalls, such as between the web server 20 and the cache files 26. In addition, other embodiments include other ordinarily stateless servers 20 besides those that qualify as "web" servers. Of course, these statements describing other embodiments and implementations of the present invention are not intended to be comprehensive.

In one example implementation, the CGI programming 22, static pages 24 and cache files 26 are normally stored in non-volatile memory, such as one or more local hard drives, until executed or utilized in working memory 21, which includes, as an example, standard random access memory (RAM). Of course, web server 20 also preferably includes other conventional elements, such as a high performance microprocessor, networking capabilities, internal bus systems, a power supply, an operating system, input/output devices such as a keyboard, a mouse, a screen, etc., as would be understood by those reasonably skilled in the art of the present invention. However, the elements of the present invention can be implemented in any combination of software and firmware. In one preferred embodiment, the system 10 is implemented in software that is stored in a memory and that is executed by a suitable instruction execution system. Nonetheless, the system 10, which includes ordered listings of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM)

(optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 2:
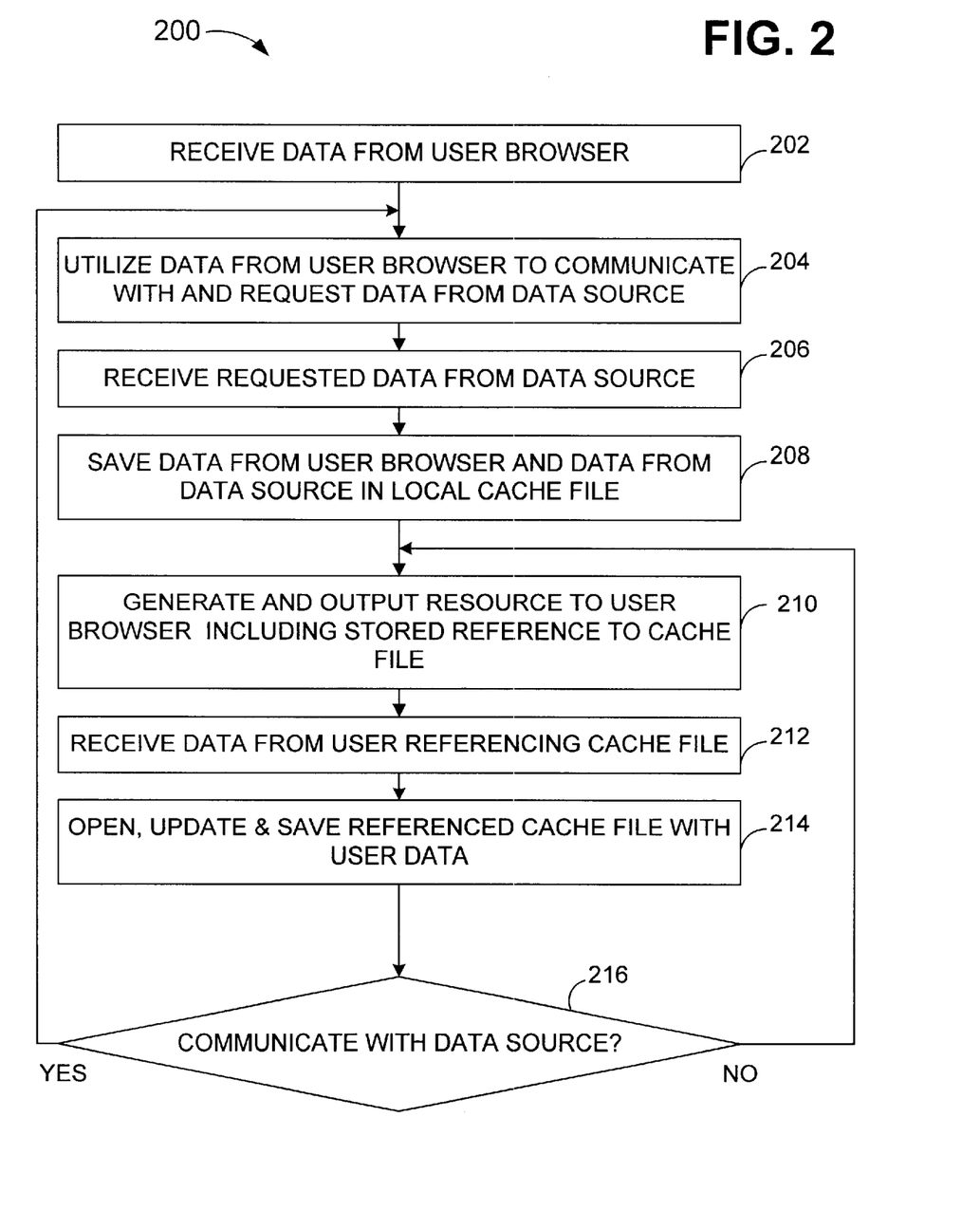
FIG. 2 is a flow chart representation of selected basic generic steps of one embodiment of the present invention.

FIG. 2 is a flow chart representation of selected basic generic steps 200 of one embodiment of the present invention. With reference to FIG. 1 and FIG. 2, the steps 200 are from the perspective of the web server 20 running one or more CGI programs 22. While there are many acceptable implementations of the elements of FIG. 1 as discussed above, only one implementation will generally be discussed hereafter, merely for purposes of clarity. Thus, based on the above discussions, applicability of the following functions to other implementations would be understood by those reasonably skilled in the art of the present invention. After data is received at the web server 20 from the user browser 52 (step 202), the web server 20 utilizes that data to communicate with and request data from the data source 31 (step 204). After data is received from the data source 31 (step 206), the web server 20 saves the data from the data source 31 and data from the user browser 52 in a cache file 26 (step 208). Subsequently, the web server 20 generates and outputs a resource, such as an HTML web page, to the user browser 52, wherein the resource includes a reference (such as a filename or ID number saved as a hidden form field or hyperlink URL parameter, as examples) to the particular saved cache file 26 related to that session (step 210). After a user interacts with the newly generated resource, the web server 20 receives additional data from the user browser 52, including the reference to the cache file 26 (step 212). Again under CGI programming 22 control, the web server 20 opens, updates, and saves the referenced cache file 26 responsive to the data received from the user browser 52 (step 214). If the CGI programming 22 determines that the data source 31 should be accessed for reporting data or retrieving additional data (step 216), processing continues with step 204. Otherwise, processing continues with step 210 without interaction with the data source 31. Of course, the generic loop shown in FIG. 2 is ultimately ended normally when an application process is finished or through failure of a user to respond to a resource, such as between steps 210 and 212. Also, another process, a cache file deleter, not shown, is continually executed on web server 20 for deleting cache files 26 experiencing no activity within a defined period of time, ranging from minutes to weeks, as examples, depending on particular implementations. During that time, a user may be able to come back to the system and retrieve automatically saved work that was saved in the cache file.

Figure 3:
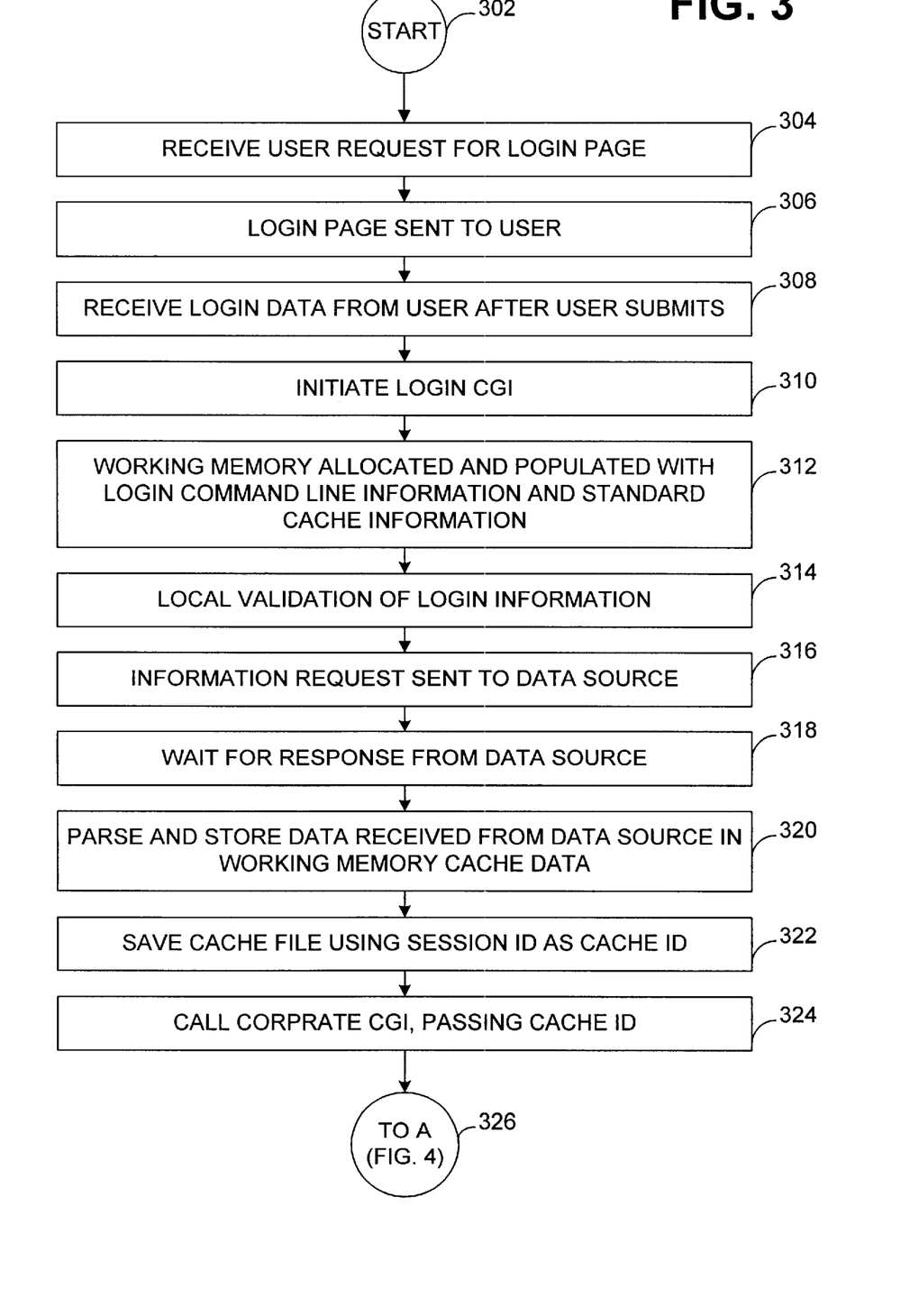
FIGS. 3–7 are flow chart representations of steps performed in one implementation of one embodiment of the present invention.

Refer now to FIGS. 3–7, which are flow chart representations of steps performed in one implementation of one embodiment of the present invention. One example of a service that generally follows the steps of FIGS. 3–7 is the automobile insurance quote request process described in U.S. patent application Ser. No. 09/203,954, filed on Dec. 2, 1998, which is incorporated herein by reference in its entirety. Of course, the disclosure of this example is not intended to limit the applicability of the principles of the present invention since they are applicable to a multitude of particular implementations. FIG. 3 of the present application shows a process starting (step 302) with the web server 20 receiving a request from a user for a login page (step 304). Such a request is typically transmitted to the web server 20 from a user browser 52 after a user selects a hyperlink from another page, in which case the URL arriving at the web server 20 may include additional variables that can be used in designing the login page that is subsequently sent to the user (step 306). Of course, the login page may simply be displayed when a user types in a home page URL or other address with no additional parameters. According to this particular example, the login page includes username and password form fields to be filled-in and submitted by the user, after which point they are received by the web server 20 (step 308). As is understood by those reasonably skilled in the art of the present invention, form fields may be reported to a web server 20 through a "post" or "get" technique. For purposes of this disclosure, the data that is returned is referred to herein as "command line" data since it comes from the user browser with the URL, or immediately thereafter. The "submit" button, or its equivalent, on the login page is set to activate one of the CGI programs 22, referred to as "login CGI" (step 310). One of the first actions of login CGI is to allocate a portion of working memory 21 for temporary use by login CGI for that particular user, and then to copy into that portion of working memory 21 the command line data received from the user, as well as standard cache information. The standard cache information is accessed from a file (not shown) in web server 20 which includes globally relevant information applicable to all CGI programs 22, such as standard names of data sources, data source port numbers, style & error directories, system status, etc.

Subsequently, login CGI attempts to locally validate the login information (step 314), such as by making sure the correct number and types of digits were entered by the user in the username and password fields. If the information does not pass local validation processing, the login page is re-sent to the user with an error message (not shown), and processing continues back at step 306. If the information passes local validation processing, the information is sent to the data source 31 as part of a request (or transaction) for additional data regarding that user (step 316). Building a transaction with a data source 31 includes using data from the standard cache information, as well as additional information about a particular user, to build the request. If data is not received from the data source 31 after the web server 20 waits (step 318) for a defined period of time response, a system error page is generated and transmitted to the user (not shown). However, if data is received from the data source 31 within that period of time, the data is parsed and stored in the working memory cache data of working memory 21 along with the previously stored standard information and command line information received from the user (step 320). Data received from the data source 31 includes, as examples, without limitation and among others, a session identification (session ID) that is used to identify the current session, an indication of whether the user is a valid user, options available to that particular user for display on an upcoming menu page, graphical style indications and available images for formatting the upcoming menu page, any results of previous processing now available to the user since a previous visit, etc. If the login information does not correspond to a registered user, the login screen is again sent with an error message (not shown), as discussed above in the case that the login information does not pass local validation. Otherwise, operation proceeds as shown, and the working memory cache data, except for the standard cache information, is saved in a file, using the session ID as the cache ID and name of the file (step 322). Of course, other embodiments of the present invention include using any name for the cache file, including one created by the web server 20, rather than by the data source 31. In one embodiment, the cache file is a data structure that, in one example of an acceptable implementation, includes various sections, including a cache ID, field definitions, validation routines, validation errors, error handlers, and log messages that keep track of the pages viewed by a user. Each field definition entry in the cache includes a tag, a value, a type, and a description. A corporate CGI program of CGI programs 22 is then called by the login CGI program, including passing the cache ID as a parameter to the corporate CGI program (step 324, 326). After that point, that portion of the working memory 21 becomes free for use by CGI programs 22. Thus, while no page has yet been sent to the user, the cache file has been saved, such as to non-volatile memory, and the session is maintained by a call between CGI programs.

Figure 4:
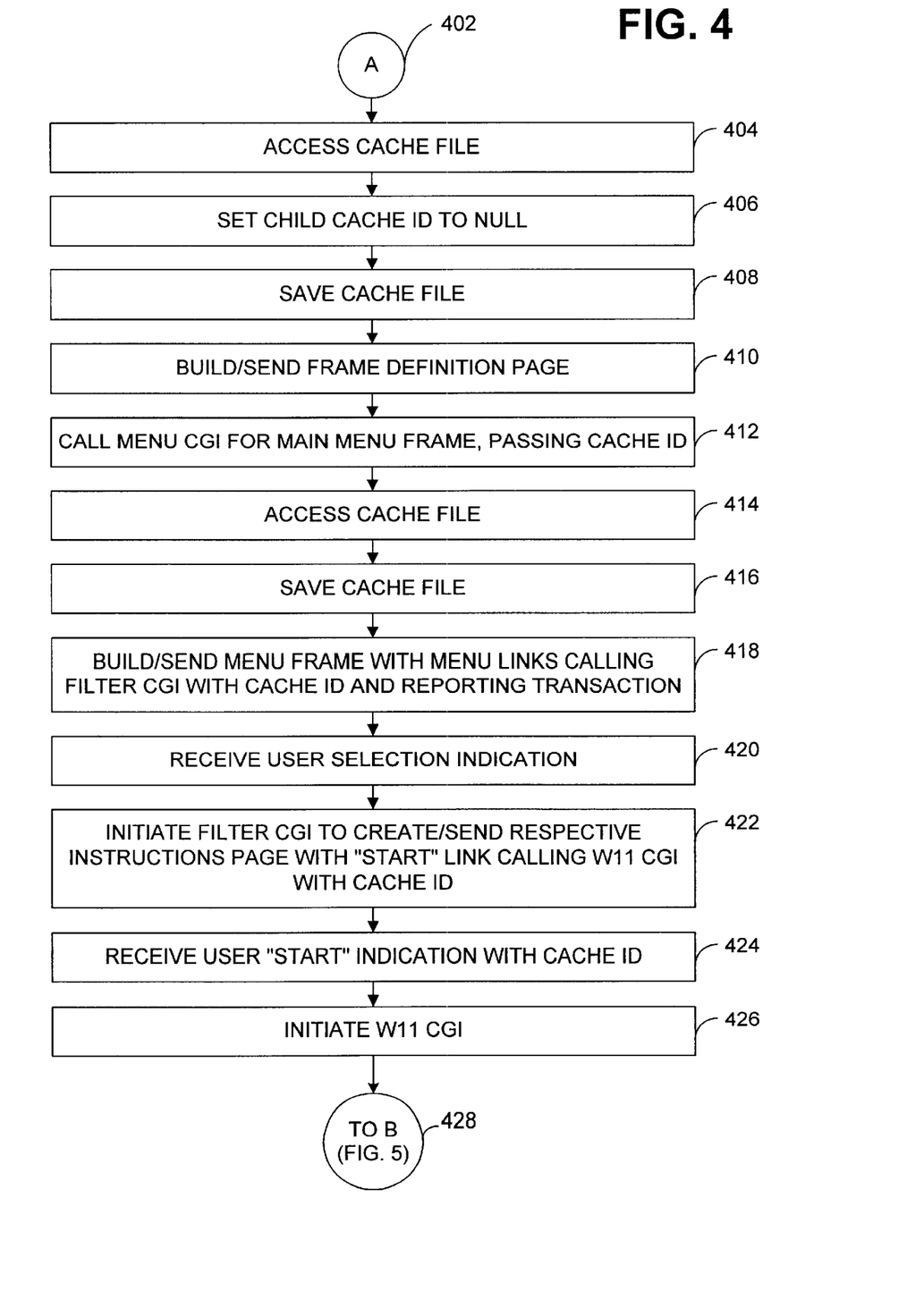

Referring now to FIG. 4, after beginning operation (step 402), the corporate CGI accesses the stored cache file (step 404). In this and other references to steps of accessing the cache file, it should be understood that a portion of working memory 21 is again allocated, and the programming copies into that memory the stored cache file referenced by the cache ID, as well as any data arriving on the command line to the invoke the programming, as well as the standard cache information discussed above. The command line data would replace any differing values from the stored cache file. As discussed below, one embodiment of the present invention includes the creation and maintenance of a session cache file, as well as sub-session, or child, cache files. When a child cache is created, such as would be useful during one of a variety of complex services, or requests, that are available to a user, the cache ID of that child cache is saved as a child cache ID in the session cache (i.e., the only cache created at this point). Since there is no need for a child cache at this point in the processing, the corporate CGI sets the child cache ID field in the session cache (step 406), and then saves the cache file (step 408). Subsequently, a frame definition page is generated and sent to the user (step 410) before a menu CGI is called for building a menu frame (step 412), with the cache ID being passed to the menu CGI. As will be seen below, one of the reasons that the corporate CGI is separated from the login CGI is to be able to conveniently jump to that page creation point without going through the previous login steps of the login CGI. Other CGI programs (not shown) are also called to build other previously defined frames (step 410), but only the menu CGI is shown for clarity.

When the menu CGI starts, as with other CGI programs, the cache file is again accessed and loaded into a new portion of working memory 21, which, as discussed above, includes loading the standard cache information and any command line data (step 414). Subsequently, the cache is again saved (step 416) before the menu frame is built and sent to the user, including menu items configured as hyperlinks calling a filter CGI with the cache ID and a request to have a notification sent to the data source 31 (step 418). In this implementation, the general purpose filter CGI program makes substitutions into a standard template files, wherein the URL calling the filter CGI specifies the file to be manipulated and the values to use in the substitutions, as well as whether to use a particular cache file for those values. Filter CGI can also be used for simple procedural logic processing, such that, for example, if-then statements in a file to be filtered can direct the filtering. In addition, filter CGI can be directed to execute a transaction with the data source, such as reporting the occurrence of a user executing a particular hyperlink, as is the case in the present embodiment when a user selects one of the menu items displayed to the user. Of course, other embodiments include individual scripts used in place of filter CGI. When user data is received (step 420), filter CGI is initiated according to the hyperlink selected by the user, which results in the reporting transaction to the data source 31, as discussed above, as well as the creation and sending to the user of an instructions page for the selected service (step 422). In this implementation, the instructions page includes a "start" hyperlink at the bottom of the instructions page, and the hyperlink includes the cache ID and a call to a large CGI program, referred to as w1I CGI. Except to any extent necessary for the notification transaction sent to the data source 31, the filter CGI does not access the cache file, thus it is not loaded into working memory and re-saved for the generation of the instructions page. This shows how the filter CGI can be used for presenting largely static pages 24 since only a small amount of data needs to be substituted, such as inserting the proper cache ID in the "start" hyperlink. Subsequently, if the user selects the "start" hyperlink, the web server 20 receives an indication of that selection, including the cache ID, and the w11 CGI is initiated (steps 426, 428). The w11 CGI is specific to a particular request or service provided by the system 10 of the present invention, according to one embodiment.

Figure 5:
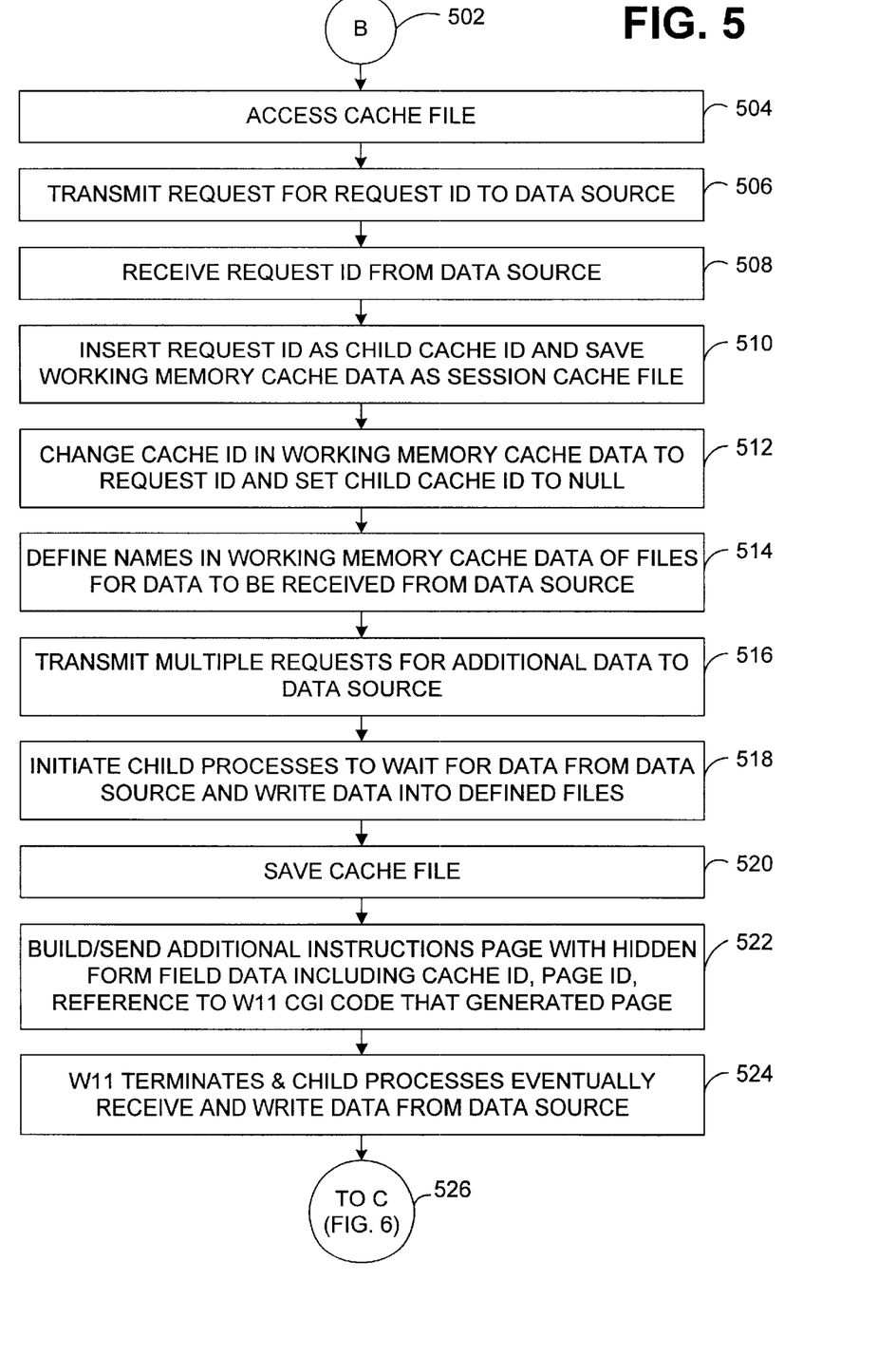

Referring now to FIG. 5, after w11 CGI begins execution (step 502), it accesses the cache file (step 504) as other scripts have done previously, including loading the referenced cache file into a working memory, along with standard cache information. At that point, a request ID transaction is built and transmitted to the data source 31 (step 506) in which the data source 31 is asked for a new request ID for assigning to this particular request. The w11 CGI is specific to a particular type of request, or service, provided by the system 10 of the present invention, according to one embodiment. After the request ID is received by the web server 20 (step 508), it is inserted as the value of the child cache ID field in the cache data currently stored in the working memory, which is then saved as a cache file (step 510). After that point, that file can be referred to as the session cache file. Subsequently, the working memory cache data is edited to change the cache ID from the session cache ID to the new request ID supplied from the data source 31, and the child cache ID field is set to NULL (step 512). As with the original cache ID, this request ID can be generated by the web server 20 or other source in other embodiments of the present invention. Names for files on the web server 20 to receive data to be requested from the data source 31 are then defined and stored in the working cache memory (step 514), and additional transactions are built and transmitted to the data source 31 to request additional information (step 516). Subsequently, child processes are created to wait for the resulting data from the data source 31 and then store that data in files according to the previously defined filenames (step 518). These child processes continue living past this particular execution of w11 CGI, as well as past the creation and transmission of a page to a user, as shown below. Subsequently, the working memory cache data is saved in a new cache file according to the new cache ID (step 520). An additional instruction page is then generated and sent to the user (step 522), including hidden form fields with data to be returned to the web server 20 when the user submits the form, including cache ID, page ID, and a reference to the w11 CGI code that generated the page. Since the w11 CGI is a large script handling results from multiple types of pages, it needs direction regarding which code section to execute for particular data, for which the page ID is used. Also, in handling errors resulting from data entered for a particular page, the w11 CGI references the code that generated the page, which is another parameter that is passed back to it with the submission of a form from the user. In addition, though not shown, a restart ID is also often passed back and forth for use with the page ID for subsequent pages to help return the correct page to a user when a user selects "back" or a "reload" on the browser since frames often prevent the URL from containing the proper information to accomplish the correct reload or return to a previous page. Finally, the w11 CGI terminates (step 524) while the child processes wait for the requested data to be received from the data source 31.

Figure 6:
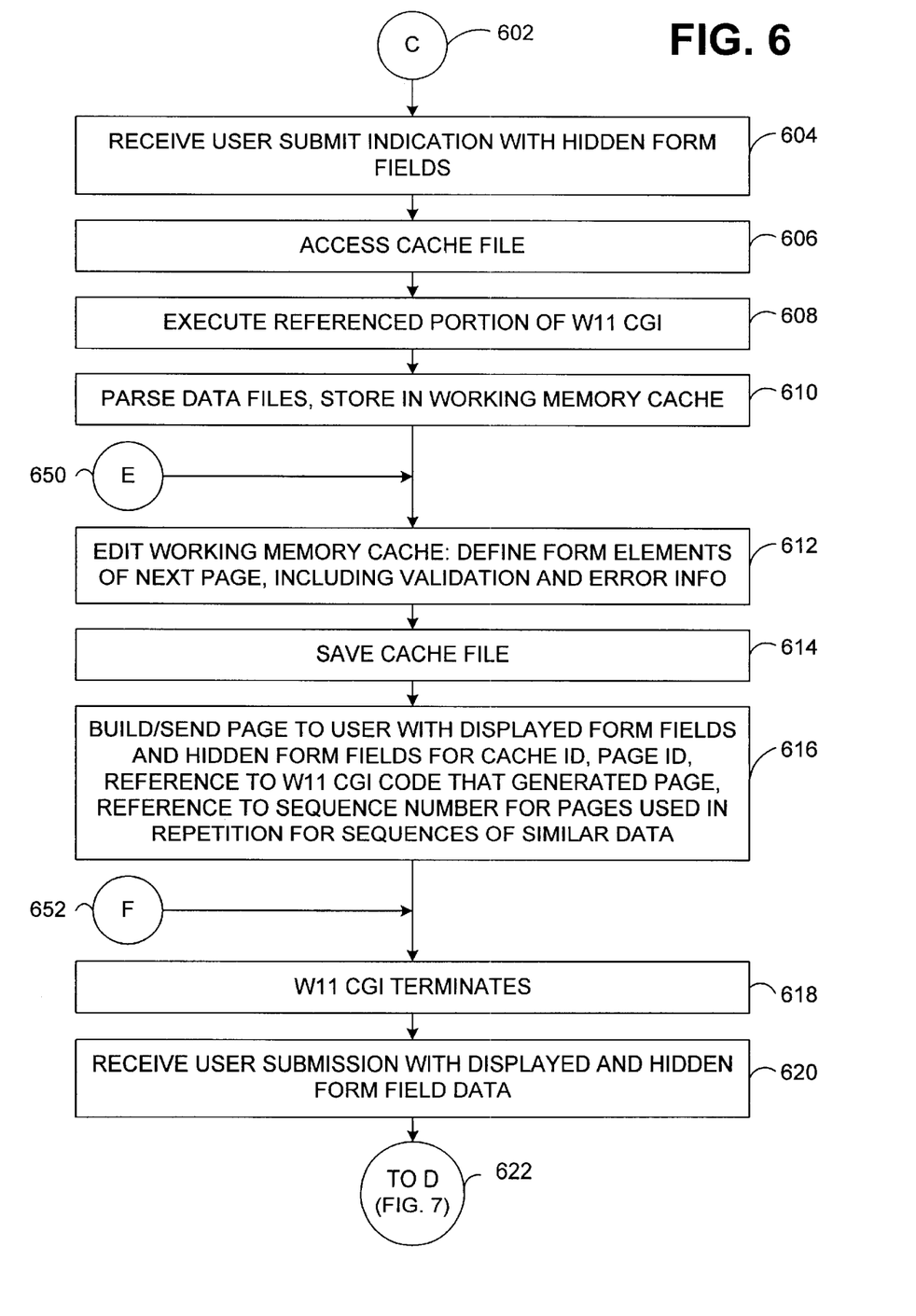

Referring now to FIG. 6, after starting (step 602), a user submit indication is received at the web server 20 along with the hidden form fields discussed above (step 604). As before, the cache file is accessed (step 606), and w11 CGI is executed at the appropriate segment for the page just shown to the user, which in this case, was simply another instruction page with a "continue" button operating as a form submit function. Since enough time should have passed for the data source 31 to reply to the previous transactions being monitored in the background by the child processes discussed above, the respective files should have been created with data from the data source 31. That data is then parsed and stored in the working memory cache (step 610), which is then edited by defining the form elements for the next page to be sent to the user, including data validation and error handling information. The data validation information includes local validation rules (e.g., number of characters, type of characters, format, etc.) and references to other programming code segments to handle more complicated validation procedures. Error handling information includes references to code segments for controlling how errors are handled and subsequently displayed to users. The data from the data source 31 is used as default values for any fields in which the user may entered previously entered data that was then stored in the data source 31, maybe even from other services or requests the user may previously have executed. Subsequently, the cache file is saved (step 614), and a page is generated and set to the user (step 616). That page includes displayed form fields for receiving input from a user and hidden form fields referencing the cache ID, page ID, reference to the code that generated the page, reference to any sequence numbers for pages used in sequential repetition, and optionally a restart ID (not shown) as necessary, as discussed above. Then, w11 CGI terminates (step 618) until a user submission is received, including hidden form field data and responses to displayed form fields (steps 620, 622).

Figure 7:
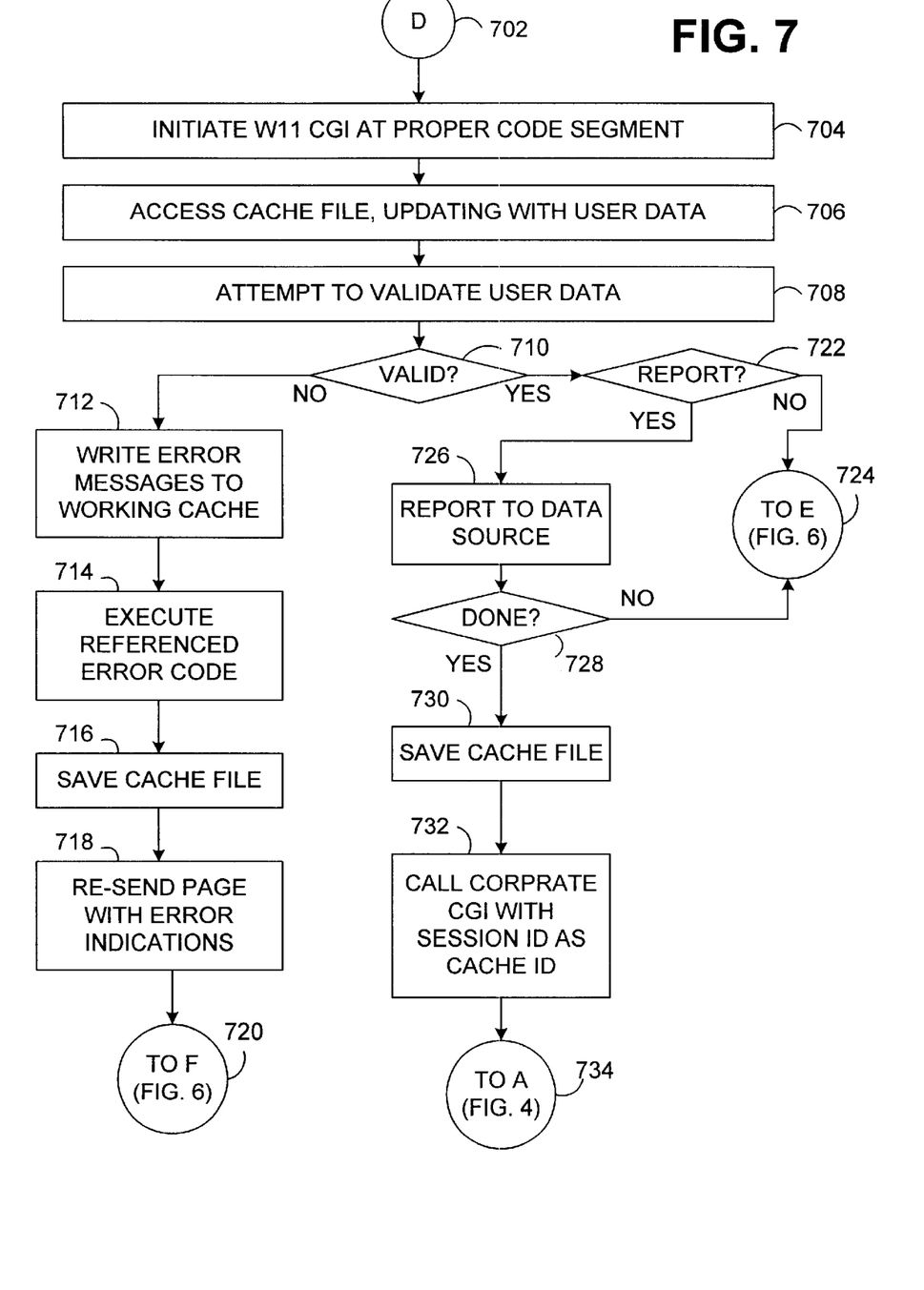

With reference to FIG. 7, after beginning (step 702), w11 CGI is again executed in response to the data received from the user (step 704) and in the location corresponding to the page (page ID) that produced the data returning from the user. The cache file is accessed and updated with the data from the user (also referred to herein as the command line data) (step 706). Local validation is then attempted (step 708), based upon the rules and any referenced validation code segments stored in the working memory cache data. If the data is not locally valid (step 710), error messages are stored in the working memory cache data (step 712) so that system administrators can help users who get stuck. Then, appropriate error handling code is executed (step 714) for controlling how errors will be reported to the user, as discussed above. The cache file is saved (step 716), and the page that generated the errors is re-sent to the user with the appropriate error messages (steps 718, 720), after which processing continues as before when the page was sent to the user (step 720 and steps 652, 618 in FIG. 6). If the data from the user was validated (step 710), w11 CGI determines if information should be reported to the data source 31 (step 722). If not, processing continues to send another page to the user (step 724 and steps 650, 612 in FIG. 6). Otherwise, a reporting transaction is generated and transmitted to the data source 31 (step 726). If there are more pages to display to the user, processing continues to display the next page (step 724 and steps 650, 612 in FIG. 6). Otherwise, the cache file is saved (step 730), and corprate CGI is called, with the session ID being used as the new cache ID (step 732), and processing continues with corprate CGI (steps 732, 734 and steps 402, 404 in FIG. 4). Eventually, the child cache file is deleted, and thus, the child cache was used during the request to store a large amount of additional data that was not needed in the session cache file.

In concluding the detailed description, it should be noted that it will be obvious to those skilled in the art that many variations and modifications can be made to the preferred embodiment without substantially departing from the principles of the present invention. All such variations and modifications are intended to be included herein within the scope of the present invention, as set forth in the following claims.

We claim:

1. A server method for maintaining a session between a client and a server, said method comprising steps of:

transmitting a resource to a client from a server, wherein the resource includes a reference to a temporary cache file;

receiving data from the client responsive to the resource, wherein the data includes a reference to the temporary cache file;

opening the temporary cache file based upon the reference included in the data received from the client;

storing at least a portion of the data received from the client in the temporary cache file; and validating data received from the client using validation rules saved in the temporary cache file.

2. The method of claim 1, wherein the temporary cache file is stored locally on the server.

3. The method of claim 1, further comprising steps of communicating with a data source and storing data from the data source in the temporary cache file.

4. The method of claim 3, wherein the communicating step includes communicating through a network with the data source.

5. The method of claim 4, wherein the communicating step includes communicating through a firewall with the data source.

6. The method of claim 3, wherein the transmitting step includes transmitting data received from the data source to the client.

7. The method of claim 1, wherein the storing step includes updating information in the temporary cache file based upon data received from the client.

8. The method of claim 1, further comprising steps of communicating with a plurality of data sources and storing data from the plurality of data sources in the temporary cache file.

9. The method of claim 1, further comprising steps of receiving a session creation request from a client, communicating with a data source responsive to receiving the session creation request, receiving data from the data source, and saving the temporary cache file with data from the session creation request and data from the data source.

10. The method of claim 9, further comprising steps of transmitting at least one additional resource to the client based upon the temporary cache file before communicating again with the data source.

11. The method of claim 9, further comprising steps of transmitting a plurality of additional resources to the client based upon the temporary cache file before communicating again with the data source.

12. The method of claim 9, wherein the session creation request includes login information from a user, and further including transmitting a login resource to a client prior to receiving the session creation request.

13. The method of claim 1, further comprising a step of deleting the temporary cache file after the passing of a defined period of time after any data is received from the client.

14. The method of claim 13, wherein the defined period of time is no more than a few hours.

15. The method of claim 13, wherein the defined period of time is at least one week.

16. The method of claim 1, wherein the server includes a web server, the client includes a user browser, the resource includes an HTML page, and the reference to the temporary cache file includes a hidden form field.

17. The method of claim 1, further comprising a step of creating a plurality of temporary cache files based upon data received from the client, wherein said plurality of temporary cache files include a session cache file and at least one sub-session cache file to which the session cache file includes a pointer.

18. A server method for maintaining a session between a client and a server, said method comprising steps of:
   transmitting a resource to a client from a server, wherein the resource includes a reference to a temporary cache file;
   receiving data from the client responsive to the resource, wherein the data includes a reference to the temporary cache file;
   opening the temporary cache file based upon the reference included in the data received from the client;
   storing at least a portion of the data received from the client in the temporary cache file; and
   communicating with a data source and storing data from the data source in the temporary cache file, wherein the communicating step includes requesting data from the source, initiating a process to both wait to receive the data from the data source and write the received data to a file with a defined name, and writing the defined file name into the temporary cache file, wherein the communicating step occurs prior to the transmitting step, except for the receiving of the data from the data source and the writing of the received data to the file with the defined name.

19. A server cache system embodied in a storage medium for maintaining a session between a server and a client, said server cache system comprising:
   a resource transmitter configured to transmit a resource to a client, wherein the resource includes a reference to a temporary cache file;
   a client data receiver configured to receive data from the client responsive to the resource, wherein the data includes a reference to the temporary cache file; and
   a temporary cache file processor configured to open the temporary cache file based upon the reference included in the data received from the client and to store at least a portion of the data received from the client in the temporary cache file, wherein said temporary cache file processor is further configured to store validation rules in said temporary cache file according to which the data received from the client is validated.

20. The system of claim 19, wherein the temporary cache file is stored locally on the server.

21. The system of claim 19, further comprising a data source communicator configured to communicate with a data source and store data from the data source in the temporary cache file.

22. The system of claim 21, wherein the data source is connected to the server through a network.

23. The system of claim 22, wherein a firewall separates the data source from the server.

24. The system of claim 21, wherein the resource transmitter is further configured to transmit data received from the data source to the client.

25. The system of claim 19, wherein the temporary cache file process is further configured to update information in the temporary cache file based upon data received from the client.

26. The system of claim 19, further including a data source communicator configured to communicate with a plurality of data sources and store data from the plurality of data sources in the temporary cache file.

27. The system of claim 19, further comprising a session creation request receiver configured to receive a session creation request from a client and a data source communicator configured to communicate with a data source responsive to the session creation request receiver receiving a session creation request from the client, wherein the temporary cache file processor is further configured to save data from the data source in the temporary cache file.

28. The system of claim 27, wherein the resource transmitter is further configured to transmit at least one additional resource to the client based upon the temporary cache file before the data source communicator again communicates with the data source.

29. The system of claim 27, wherein the resource transmitter is further configured to transmit a plurality of additional resources to the client based upon the temporary cache file before the data source communicator again communicates with the data source.

30. The system of claim 27, wherein the session creation request includes login information from a user, and further including a login resource transmitter configured to transmit a login resource to a client prior to the session creation request receiver receiving the session creation request.

31. The system of claim 19, further including a temporary cache file deleter configured to delete the temporary cache file after the passing of a defined period of time after any data is received from the client by the client data receiver.

32. The system of claim 31, wherein the defined period of time is no more than a few hours.

33. The system of claim 31, wherein the defined period of time is at least one week.

34. The system of claim 19, wherein the server includes a web server, the client includes a user browser, the resource includes an HTML page, and the reference to the temporary cache file includes a hidden form field.

35. The system of claim 19, wherein said temporary cache file processor is configured to create a plurality of temporary cache files based upon data received from the client by the client data receiver, wherein said plurality of temporary cache files include a session cache file and at least one subsession cache file to which the session cache file includes a pointer.

36. A server cache system embodied in a storage medium for maintaining a session between a server and a client, said server cache system comprising:

a resource transmitter configured to transmit a resource to a client, wherein the resource includes a reference to a temporary cache file;

a client data receiver configured to receive data from the client responsive to the resource, wherein the data includes a reference to the temporary cache file;

a temporary cache file processor configured to open the temporary cache file based upon the reference included in the data received from the client and to store at least a portion of the data received from the client in the temporary cache file; and a data source communicator configured to communicate with a data source and store data from the data source in the temporary cache file, wherein the data source communicator is further configured to request data from the data source, initiate a process to both wait to receive the data from the data source and write the received data to a file with a defined name, and write the defined file name into the temporary cache file, wherein the data source communicator is configured to operate prior to the transmission of the resource to the client, except for the receiving of the data from the data source and the writing of the received data to the file with the defined name.

* * * * *